A. E. McCREA.
APPARATUS FOR GROWING PLANTS.
APPLICATION FILED MAY 24, 1918.
1,315,375.
Patented Sept. 9, 1919.
2 SHEETS—SHEET 1.
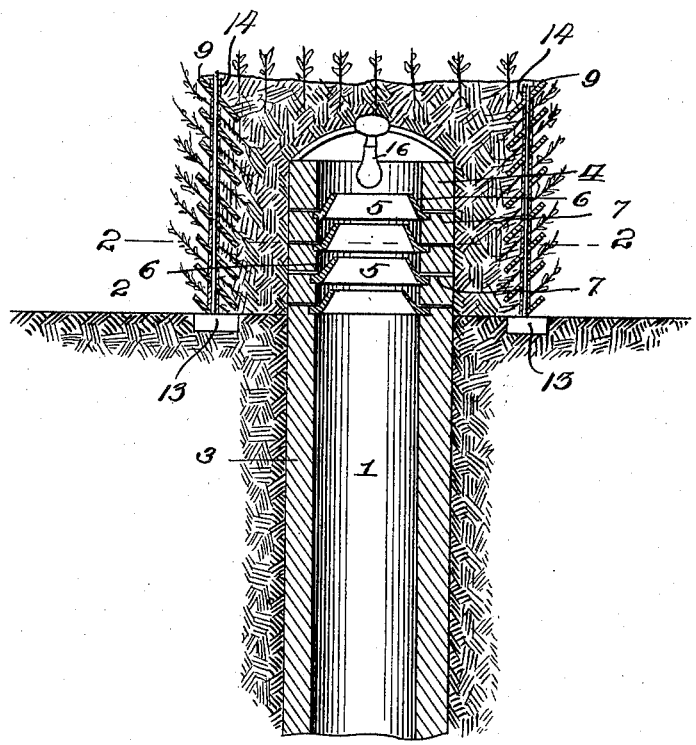
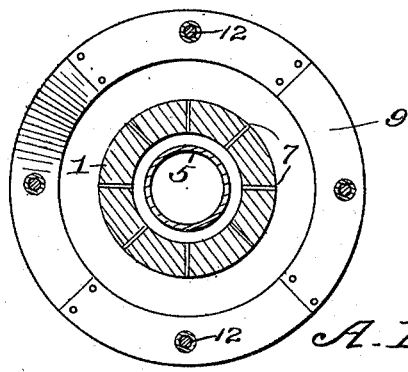
A. E. McCrea,
Inventor

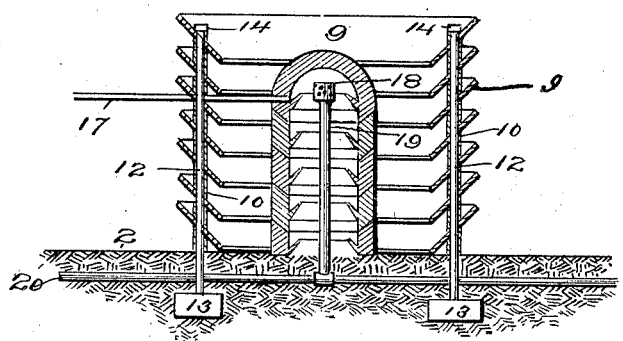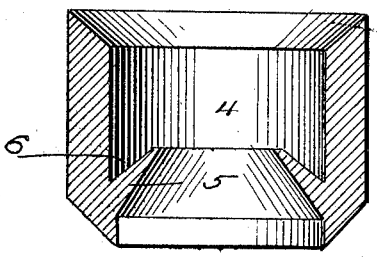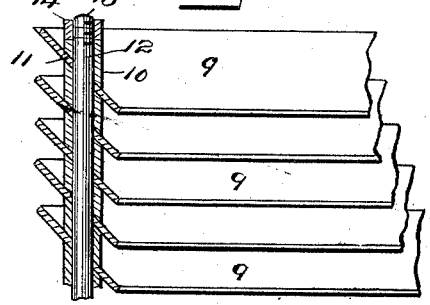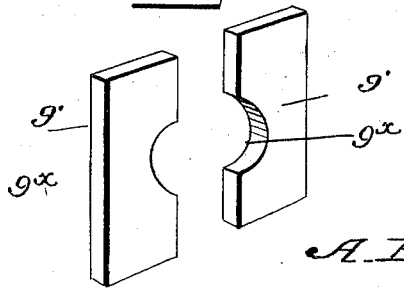

UNITED STATES PATENT OFFICE.

ALLINGHAM E. McCREA, OF OMAHA, NEBRASKA.

APPARATUS FOR GROWING PLANTS.

1,315,375.  Specification of Letters Patent.  Patented Sept. 9, 1919.

Application filed May 24, 1918. Serial No. 236,335.

*To all whom it may concern:*

Be it known that I, ALLINGHAM E. Mc-CREA, a citizen of the United States, residing at Omaha, in the county of Douglas and State of Nebraska, have invented certain new and useful Improvements in Apparatus for Growing Plants, of which the following is a specification.

My invention relates to improvements in apparatus for growing plants, and one object of my invention is the provision of an apparatus which will grow or propagate a large number of plants in a very small amount of space and will insure the proper amount of light and moisture to obtain the best results.

Another object of my invention is the provision of an apparatus which will accommodate a great number of plants, which will make them readily accessible for the purpose of cultivation or transplanting and which will supply and evenly distribute moisture to the roots of the plants.

Another object of my invention is the provision of means for growing plants which in addition to possessing the advantages stated, will be capable of production at a small price, which will render the cultivation of the plants easy, and which in general will be efficient and practical.

To attain the objects stated and such others as are inherent to an invention of this character my invention consists of an apparatus for growing plants embodying novel features of construction and combination of parts, substantially as shown, decribed and claimed herein.

Figure 1 is a vertical sectional view of an apparatus for growing plants constructed in accordance with and embodying my invention.

Fig. 2 is a sectional view taken on line 2 2 of Fig. 2.

Fig. 3 is a vertical central sectional view of a modified construction of my apparatus.

Fig. 4 is a sectional view on an enlarged scale of one of the members of which the dome is constructed.

Fig. 5 is a sectional view on an enlarged scale showing the manner of constructing the frame for receiving and dividing the earth into compartments or shelves, and Fig. 6 is a detail view on an enlarged scale of a part of one of the plates or walls which form the choking means, to guide and distribute the plants and destroy the weeds or rank growth.

In the accompanying drawings the same numerals of reference are used to indicate similar parts in all the views:

The numeral 1 designating a well or water supply below the ground 2, and which is provided with a suitable lining 3, and above and in communication with the well is the dome projecting to a suitable height and composed of the tile or like members 4, having mounted interiorly thereof or formed therewith the conical vapor or water traps 5, which catch the water in their basins 6, and direct or deliver it to the outlets 7, between the tiles to the soil or earth 8, sustained about the dome by means of the shelves 9, arranged a suitable distance apart and at an incline and in concentric relation to form plant receiving compartments.

The circular, inclined, concentric shelves thus forms a series of compartments to receive the earth and provide a large planting area upon the top as well as around the water receiving and distributing dome and the plants are thus properly received and their growth is permitted with ample space and the incline directs the plants upward and outward, and the said shelves are secured in spaced relation and at the desired incline by means of the sleeves 10, with their inclined ends 11, the sleeves and shelves being mounted on the vertical sustaining rods 12, anchored in the earth at 13, and clamped in place by nuts 14, on the threaded ends 15, of said rods.

This construction provides a mound of earth divided into vertical plant receiving compartments and a top soil enabling the planting in a small space of a great many plants, and in the mound is disposed the dome into which the vapors rising from the well caused by the sun's heat, or if desired by the heating bulb 16, in the top of the dome, to pass into the traps or basins of the tile members and from them to be delivered to the earth and to the roots of the plants between the series of shelves, thus insuring the proper growth of the plants.

In Fig. 3 is shown a modified form of my invention in which I employ either the water supply pipe 17 leading to the top of the dome, or the spray head 18, on the vertical pipe 19, supplied from the pipe 20, in which constructions water in direct or spray form is supplied to the traps and delivered to the roots of the plants, the apparatus thus using either vapor or water in an efficient and practical manner.

In Fig. 6 is shown means for guiding the plants through and between the walls, forming what may be termed a choking means, consisting of the vertical walls $9^1$, formed with cut away portions forming a passage $9^x$, these walls being disposed between the series of concentric plates and choking the weeds or rank growth, but allowing the plants to pass through the passages $9^x$, and thus be spaced and separated the proper distance to obtain the best results.

I claim:

1. In a device for promoting the rapid growth of plant life, comprising a dome having a chamber to which moisture is supplied, said chamber being provided with ledges for the collection of moisture, a series of plant and earth receiving compartments arranged around said dome, said compartments being adapted to receive plants and earth and passages of communication between the pockets formed by the ledges in the chamber of the dome and the plant and earth receiving compartments for the passage of moisture to the plant and earth receiving compartments.

2. In a device for promoting the rapid growth of plant life, comprising a dome, means for supplying moisture to said dome, a series of plant receiving compartments arranged around the dome, said compartments being formed by conical shaped rings having registering apertures, vertical rods extending through said apertures, collars carried by the rods and disposed between the conical rings thereby maintaining them in spaced relation to each other and means whereby moisture from said dome will be supplied to the plant receiving compartments.

In testimony whereof I affix my signature.

ALLINGHAM E. McCREA.

Witnesses:
J. W. MARTIN,
A. W. POLAND.

Copies of this patent may be obtained for five cents each, by addressing the "Commissioner of Patents, Washington, D. C."